US006972661B2

(12) United States Patent
Wang

(10) Patent No.: US 6,972,661 B2
(45) Date of Patent: Dec. 6, 2005

(54) ANTI-INTERFERENCE RELAY DEVICE FOR SIGNAL TRANSMISSION

(75) Inventor: Cheng-Si Wang, Changhua Hsien (TW)

(73) Assignee: Trans Electric Co., Ltd., Changhua Hsien (TW)

( * ) Notice: Subject to any disclaimer, the term of this patent is extended or adjusted under 35 U.S.C. 154(b) by 227 days.

(21) Appl. No.: 10/402,287

(22) Filed: Mar. 28, 2003

(65) Prior Publication Data

US 2004/0189485 A1 Sep. 30, 2004

(51) Int. Cl.[7] .......................... G05B 19/00; H04B 10/00

(52) U.S. Cl. ................... 340/5.61; 340/425.1; 398/126

(58) Field of Search ........................... 340/825.66, 291, 340/425.1, 825.69, 825.72; 398/126, 106; 341/176; 348/734; 307/119; 455/572, 42, 455/574, 127.1

(56) References Cited

U.S. PATENT DOCUMENTS

| | | | | |
|---|---|---|---|---|
| 4,864,647 | A * | 9/1989 | Harrington | 398/126 |
| 5,142,397 | A * | 8/1992 | Dockery | 398/126 |
| 5,815,108 | A * | 9/1998 | Terk | 341/176 |
| 6,400,968 | B1 * | 6/2002 | White et al. | 455/572 |
| 6,812,594 | B2 * | 11/2004 | Face et al. | 307/119 |

* cited by examiner

*Primary Examiner*—Michael Horabik
*Assistant Examiner*—William Bangachon
(74) *Attorney, Agent, or Firm*—Alan D. Kamrath; Nikolai & Mersereau, P.A.

(57) ABSTRACT

An anti-interference relay device has a receiving module and a transmitting module. The receiving module modulates a received IR signal from a remote controller and an identification (ID) code of the receiving module to an RF signal and then broadcasts the RF signal. When the RF signal is demodulated by the transmitting module, the demodulated ID code is compared with a preset ID code. If the two ID codes are matched, the demodulated IR signal is allowed to output to control an appliance, otherwise the IR signal is ignored.

2 Claims, 3 Drawing Sheets

ANTI-INTERFERENCE RELAY DEVICE FOR SIGNAL TRANSMISSION

BACKGROUND OF THE INVENTION

1. Field of Invention

The present invention relates to an anti-interference relay device, and more particularly to a signal relay device that relays the control signals transmitted between a remote controller and a receiving device, such as a television, and prevents the relayed signal from being interfered with.

2. Related Art

For most electrical appliances, such as televisions, air conditioners, video players etc., remote controllers are applied to conveniently control these products. Because the control signal emitted from the remote controller is in the form of an infrared (IR) beam, the remote controller should be aimed at the desired appliance within a region that the IR signals can activate the appliance. However, users still need to be concerned about the signal transmitting direction when using the remote controllers.

To solve such a problem, a kind of relay device composed of a transmitting module and a receiving module, is presented to relay the infrared signals between the remote controller in the form of radio frequency (RF) signal and an electrical appliance. When the relay device receives the IR signals, the infrared signals to RF signal are modulated and broadcast by the transmitting module to the receiving module that had been positioned to aim at the appliance to be controlled. The RF signal received by the receiving module is then demodulated to an IR signal and emitted to the appliance. Such a relay device would provide a superior IR signal transmission means because the transmitted control signal is in the form of an RF signal.

However, one problem will occur when two relay devices are employed. For example, if two relay devices are respectively applied in two houses neighbored with each other, it is possible that the transmitting module in house A will interfere with the receiving module in house B and cause the undesired activation of the electrical appliances.

To overcome the shortcomings, an anti-interference relay device for signal transmission in accordance with the present invention obviates or mitigates the aforementioned drawbacks.

SUMMARY OF THE INVENTION

The main objective of the present invention is to provide an anti-interference signal relay device that applies to relay infrared (IR) signals transmitted between a remote controller and an electrical appliance such as a TV, and further to prevents the electrical appliance from being interfered with by undesired IR signals.

To achieve the objective of the present invention, the anti-interference signal relay device is composed of a receiving module and a transmitting module. The receiving module is applied to receive an IR signal from any of specified remote controllers, and then broadcasts the IR signal accompanying with an identifying code in the form of radio frequency (RF) signals.

After the receiving module receives and demodulates the broadcast RF signal to the original IR signal and the ID code, the receiving module confirms whether the ID code complies with an ID code that is preset in the receiving module. If the ID code is correct, the receiving module then outputs the IR signal to control the electrical appliance. Otherwise, the IR signal is not allowed to be output.

Other objectives, advantages and novel features of the invention will become more apparent from the following detailed description when taken in conjunction with the accompanying drawings.

DETAILED DESCRIPTION OF THE INVENTION

Figure 1:
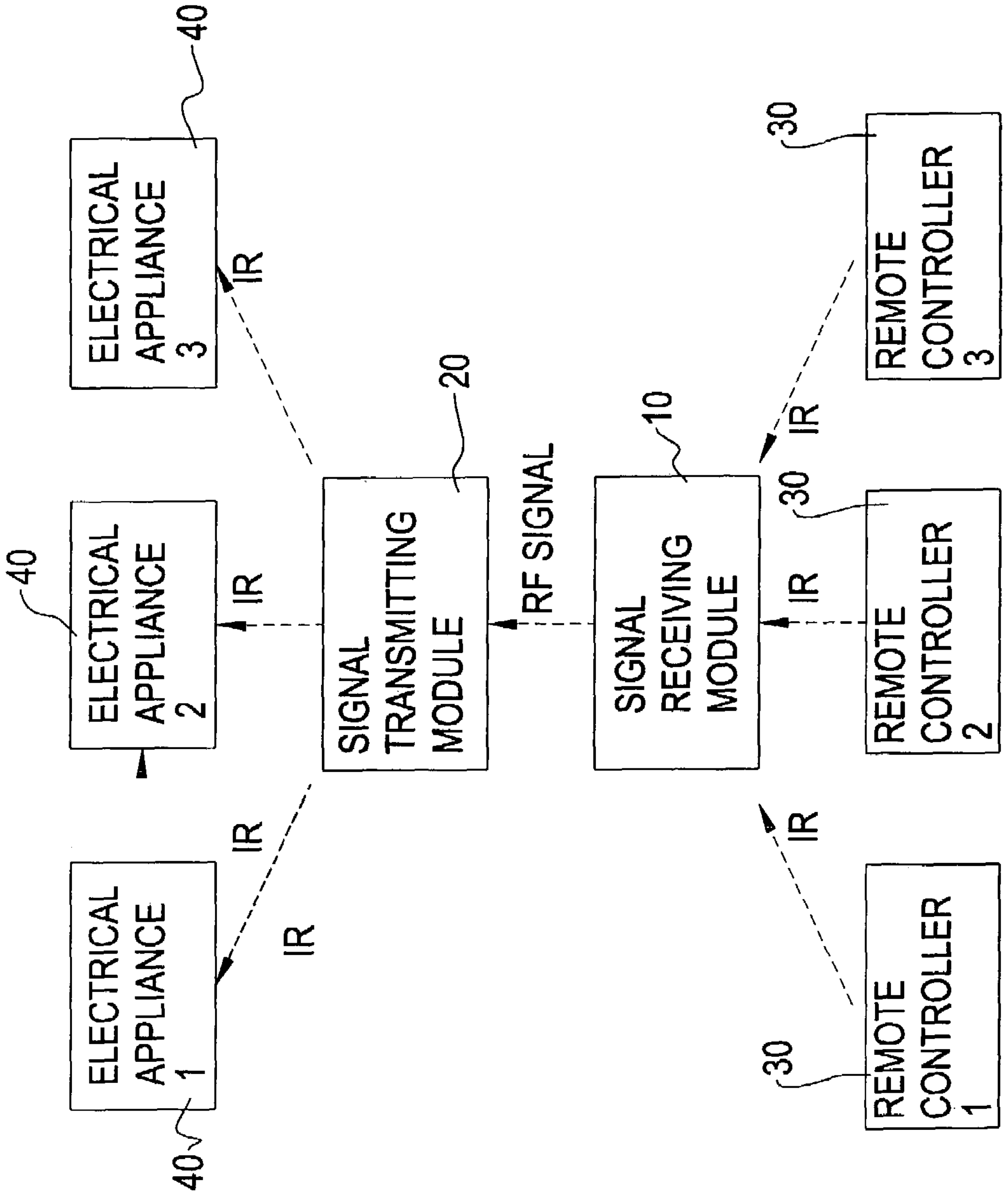
FIG. 1 is an operation block diagram of an anti-interference signal relay device in accordance with the present invention.

With reference to FIG. 1, an anti-interference signal device of the present invention is composed of a signal receiving module (10) and a signal transmitting module (20). The receiving module (10) for receiving infrared (IR) signals from any of specified remote controllers (30) is operated in accompaniment with the transmitting module (20) that outputs signals to a corresponding electrical appliance (40), such as a television, to be controlled by the corresponding remote controller (30).

Figure 2:
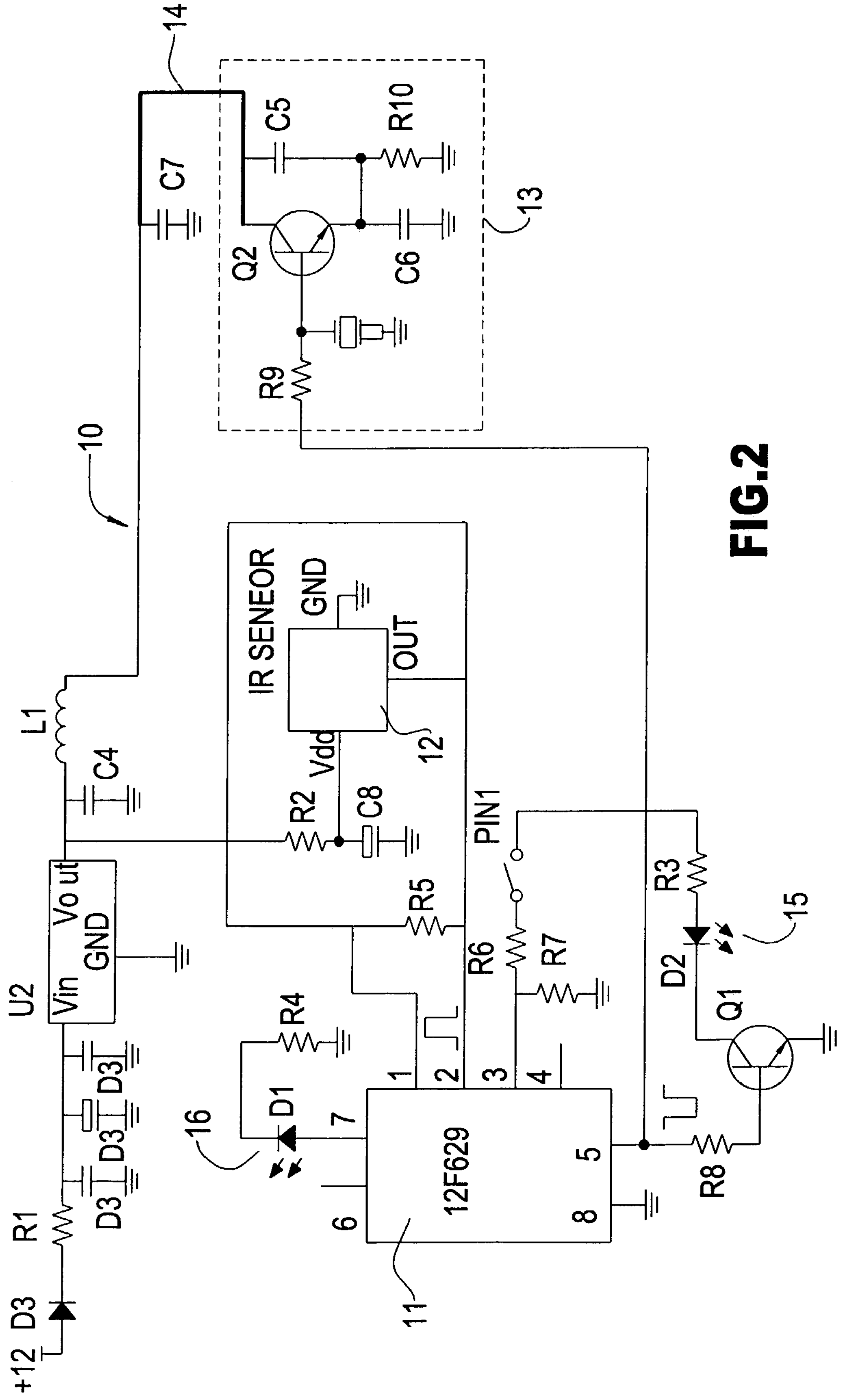
FIG. 2 is a circuit diagram of a signal receiving unit of the anti-interference signal relay device in accordance with the present invention.
Figure 3:
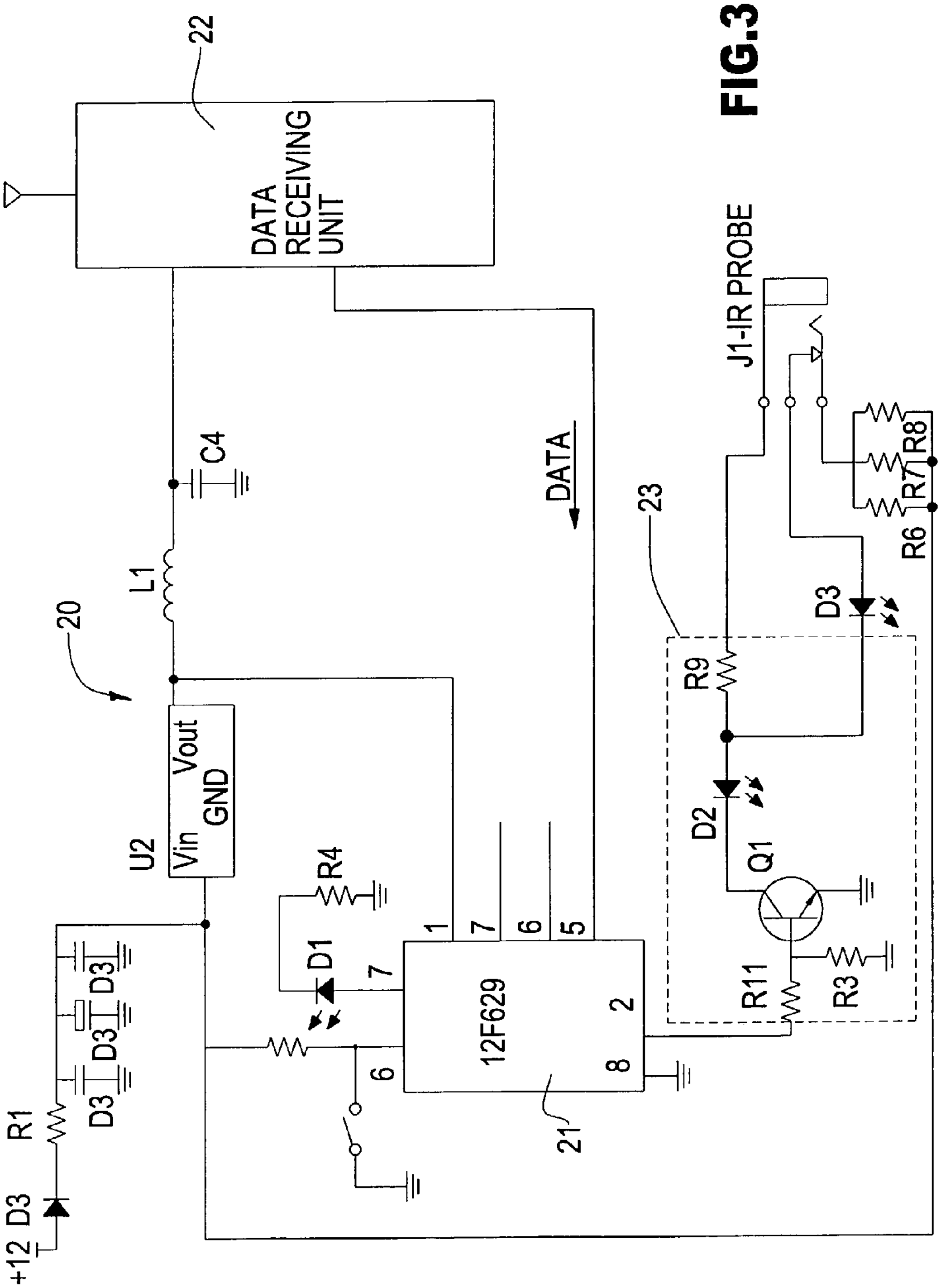
FIG. 3 is a circuit diagram of a signal transmitting unit of the anti-interference signal relay device in accordance with the present invention.

With reference to FIG. 2, the receiving module (10) comprises a microprocessor (11) that connects to an IR sensor (12), a radio frequency (RF) signal modulating unit (13), a microstrip antenna (14), a receiving indicating light (15) and an operation indicating light (16). As shown in FIG. 3, the transmitting module (20) includes a microprocessor (21) that connects to a data receiving unit (22), and an IR signal emitting unit (23).

With reference to FIG. 2, when the receiving module (10) and the transmitting module (20) are activated, both enter into an idle mode. Once the IR sensor (12) detects a signal and then passes the signal to the microprocessor (11), the microprocessor (11) determines whether the received signal is a noise or a control signal. If the received signal is a control signal from the remote controller (30), the receiving unit (10) enters a stand by mode and the operation indicating light (16) is activated. As the user presses buttons on the remote controller (30), the receiving indication light (15) flashes correspondingly. The microprocessor (11) then outputs the received control signal together with an identification code (ID code) to the RF signal modulating unit (13). The RF signal modulating unit (13) modulates the received control signal and the ID code into an RF signal and then broadcasts the RF signal via the microstrip antenna (14). For the receiving module (10), if no IR signal is detected for a designated period, for example five seconds, the receiving module (10) will return to the idle mode to mitigate the power consumption.

With reference to FIG. 3, when the transmitting module (20) receives the RF signal through the data receiving unit (22), the microprocessor (21) demodulates the RF signal to the original IR signal and the ID code. Then the microprocessor (21) will judge whether the ID code matches with a preset ID code that is stored in the transmitting module (20). If the received ID code does not comply with the preset ID code, the demodulated IR signal is ignored. Otherwise, the signal emitting unit (23) will transmit the IR signal to the electrical appliance (40) that the remote controller (30)

intends to operate. If the transmitting module (20) does not receive any signals from the receiving module (10) for a period, the transmitting module (20) enters the idle mode. Thereby the transmitting module (20) will not emit any IR signal to interfere with other electrical products.

From the foregoing description, because the electrical appliance (40) is operated through the receiving module (10) and the transmitting module (20) that are designed to match with each other, the electrical appliance (40) would not be activated by any undesired IR signal or noise.

The invention may be varied in many ways by a skilled person in the art. Such variations are not to be regarded as a departure from the spirit and scope of the invention, and all such modifications are intended to be included within the scope of the following claims.

What is claimed is:

1. An anti-interference relay device for signal transmission comprising:

a receiving module adapted to receive an infrared (IR) signal from a remote controller, wherein the receiving module comprises:

a first microprocessor connected to an IR sensor, a radio frequency (RF) signal modulating unit and a microstrip antenna, wherein after the IR sensor receives the IR signal, the IR signal and an identification code are modulated by the RF signal modulating unit to a RF signal and then output via the microstrip antenna;

wherein if no IR signal is detected for a designated period, the receiving module returns to an idle mode to mitigate the power consumption;

a transmitting module adapted to control an electrical appliance based on the RF signal, wherein the transmitting module comprises:

a second microprocessor connected to a data receiving unit and an IR signal emitting unit, wherein when the RF signal is received by the receiving unit and then demodulated to the IR signal and the ID code, the microprocessor compares the demodulated ID code with a preset ID code stored in the transmitting unit;

wherein if the demodulated ID code matches with the preset ID code, the IR signal is output by the IR signal emitting unit to control the electrical appliance, otherwise the IR signal is ignored; and wherein if the transmitting module receives no signal from the receiving module for a period, the transmitting module enters an idle mode to prevent interference to other electrical products.

2. The anti-interference relay device as claimed in claim 1, wherein the first microprocessor further connects to a receiving indicating light and an operation indicating light.

* * * * *